(12) United States Patent
Knight et al.

(10) Patent No.: US 6,464,016 B2
(45) Date of Patent: Oct. 15, 2002

(54) HITCH SYSTEM

(75) Inventors: Harry Knight, 13916 Huntley Ave., Baton Rouge, LA (US) 70816; Kinsey Estess, Baker, LA (US); Ernest Randall New, Zachary, LA (US)

(73) Assignees: Harry Knight, Baton Rouge, LA (US); Kinsey V. Estess, Baton Rouge, LA (US)

( * ) Notice: Subject to any disclaimer, the term of this patent is extended or adjusted under 35 U.S.C. 154(b) by 0 days.

(21) Appl. No.: 09/782,356

(22) Filed: Feb. 12, 2001

(65) Prior Publication Data

US 2002/0108763 A1 Aug. 15, 2002

Related U.S. Application Data

(60) Provisional application No. 60/183,126, filed on Feb. 17, 2000.

(51) Int. Cl.$^7$ .............................................. A01B 33/08
(52) U.S. Cl. ....................................... 172/444; 172/439
(58) Field of Search ................. 172/439, 444, 172/677, 679, 680, 443, 445

(56) References Cited

U.S. PATENT DOCUMENTS 3,502,152 A * 3/1970 Johnson ........................ 172/40
5,346,018 A * 9/1994 Koster .......................... 172/47

* cited by examiner

*Primary Examiner*—Christopher J. Novosad
(74) *Attorney, Agent, or Firm*—Jones, Walker, Waechter, Poitevent, Carrere & Denegre, LLP

(57) ABSTRACT

A hitch system attachable between a towing utility vehicle and a towed device, where the utility vehicle has a power source. The hitch system has a first frame adapted to pivotably couple the towing vehicle and the towed device, a lift frame attachable to the utility vehicle, where the lift frame has a first member and a second member and the second member is pivotably connected to the first member. The second member is operationably connected to the power source to pivot the second member in relation to the first member. The second member has a tow point, which is offset from the centerline of the second member, enabling the towed device to be towed in an offset configuration. Finally, a top link pivotably connects the second member and the utility vehicle, the top link connecting at the tow point.

13 Claims, 5 Drawing Sheets

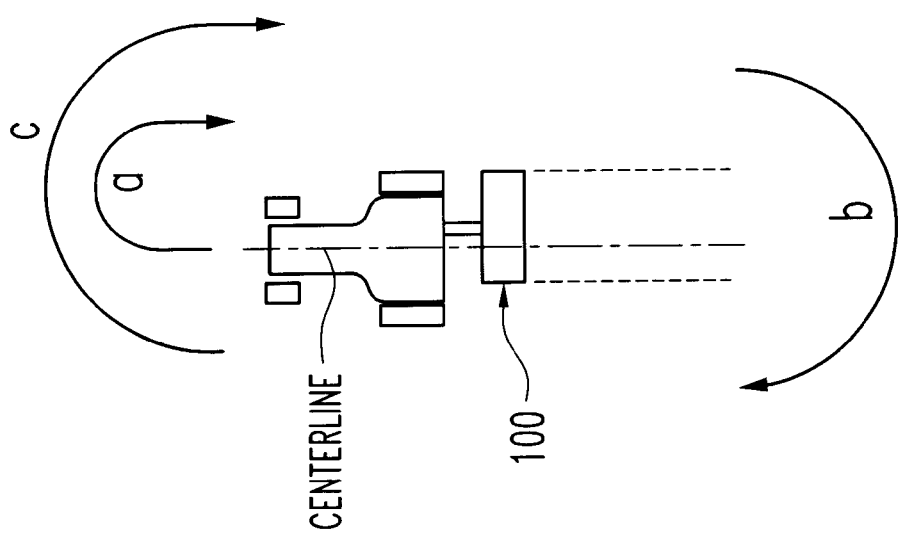

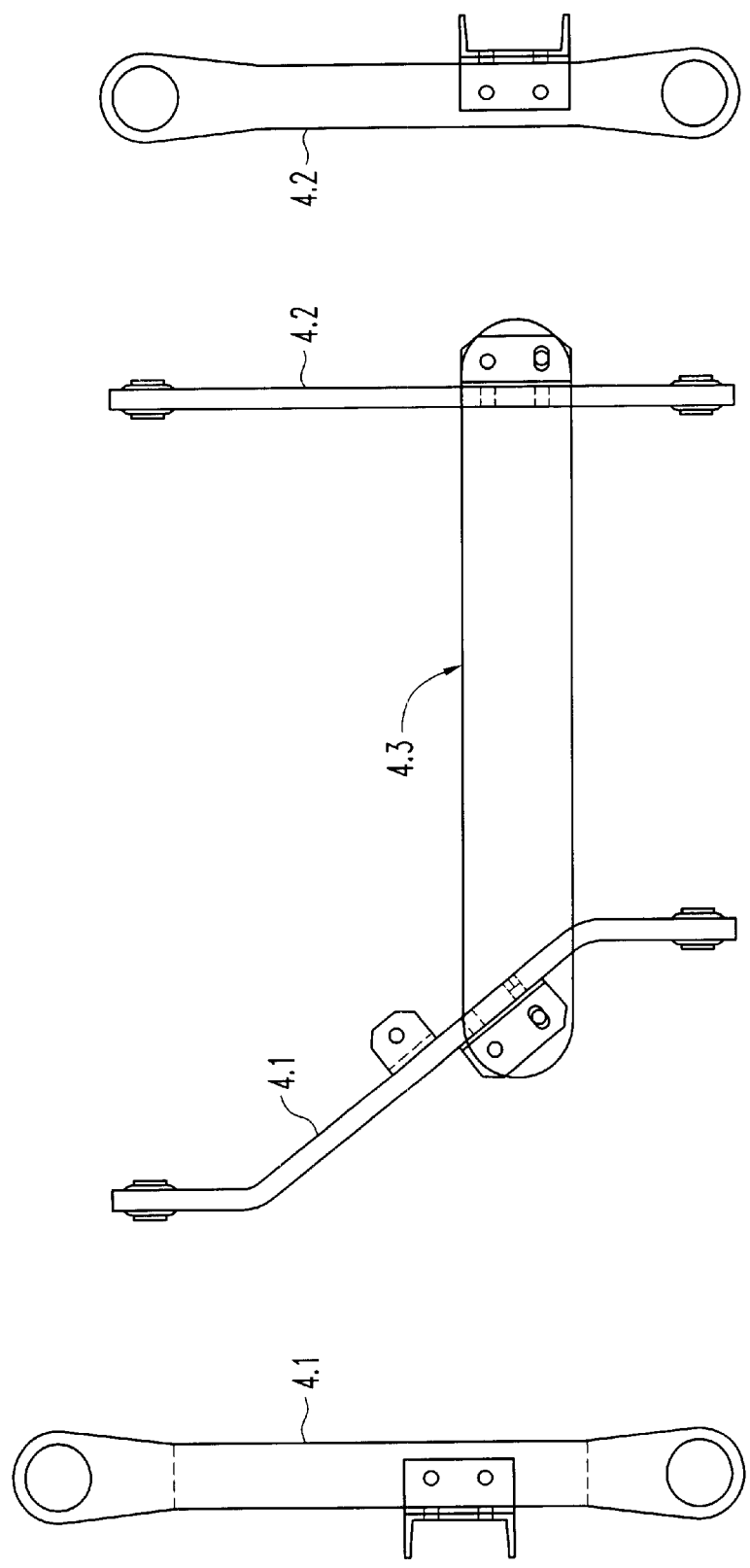

HITCH SYSTEM

PRIORITY CLAIM

This application claims the priority benefit of U.S. Provisional Application 60/183,126 filed on Feb. 17, 2000.

FIELD OF INVENTION

This invention relates to towing systems utilized for utility vehicles. In particular, the invention relates to a hitch system linking the towing vehicle with the towed vehicle.

BACKGROUND OF THE INVENTION

Methods of connecting towed vehicles or equipment behind a pulling or towing vehicle are many and varied, from a simple ball coupling to complex pick-up mechanisms driven by a power take off (PTO). The tow point, however, is generally along the towing vehicle's centerline. For certain types of towed equipment, such as aerators, towing from the centerline is disadvantageous.

Additionally, certain types of towed equipment are towed in two configurations, deployed or non-deployed. In a deployed configuration, the towed equipment is lowered until the working end of the towed equipment is in operational contact with the ground. In a non-deployed configuration, the working end of the towed equipment is not in operational contact with the ground. For instance, when towing a bush-hog behind a utility vehicle, the bush-hog can be pulled in a lowered configuration (deployed) in contact with the ground for cutting, or in a raised configuration (non-deployed), for transportation. In the non-deployed configuration, the raised bush-hog has at least one degree of freedom about the towed point, and consequently, the bush-hog, in transport, can swing about the towed point, potentially causing damage to the bush-hog or the towing vehicle.

OBJECTS OF THE INVENTION

It is an object of the invention to provide a hitch system having a tow point positioned off the centerline of the towing vehicle.

It is an object of the invention to provide a simple system to resist movement of the towed device about the tow point in the non-deployed configuration.

SUMMARY OF THE INVENTION

The present invention is a hitch system for a utility vehicle. The hitch system is used in conjunction with equipment to be pulled behind the utility vehicle. The hitch system has a first frame attachable to the towed vehicle, and a pivotable member attached to the first frame. The pivotable member has a tow point thereon, to which an arm is attached, which distal end is connected to the towed device. The hitch system also has a second frame pivotally attached between the towed device and the towing vehicle. Engagable with this second frame is a stop mechanism, attached to the towed device.

BRIEF DESCRIPTION OF THE DRAWINGS

FIG. 2 is a schematic showing a travel path.

FIG. 3 is a top view of the second frame showing the dog leg portion.

DETAILED DESCRIPTION OF THE PREFERRED EMBODIMENT

Figure 1:
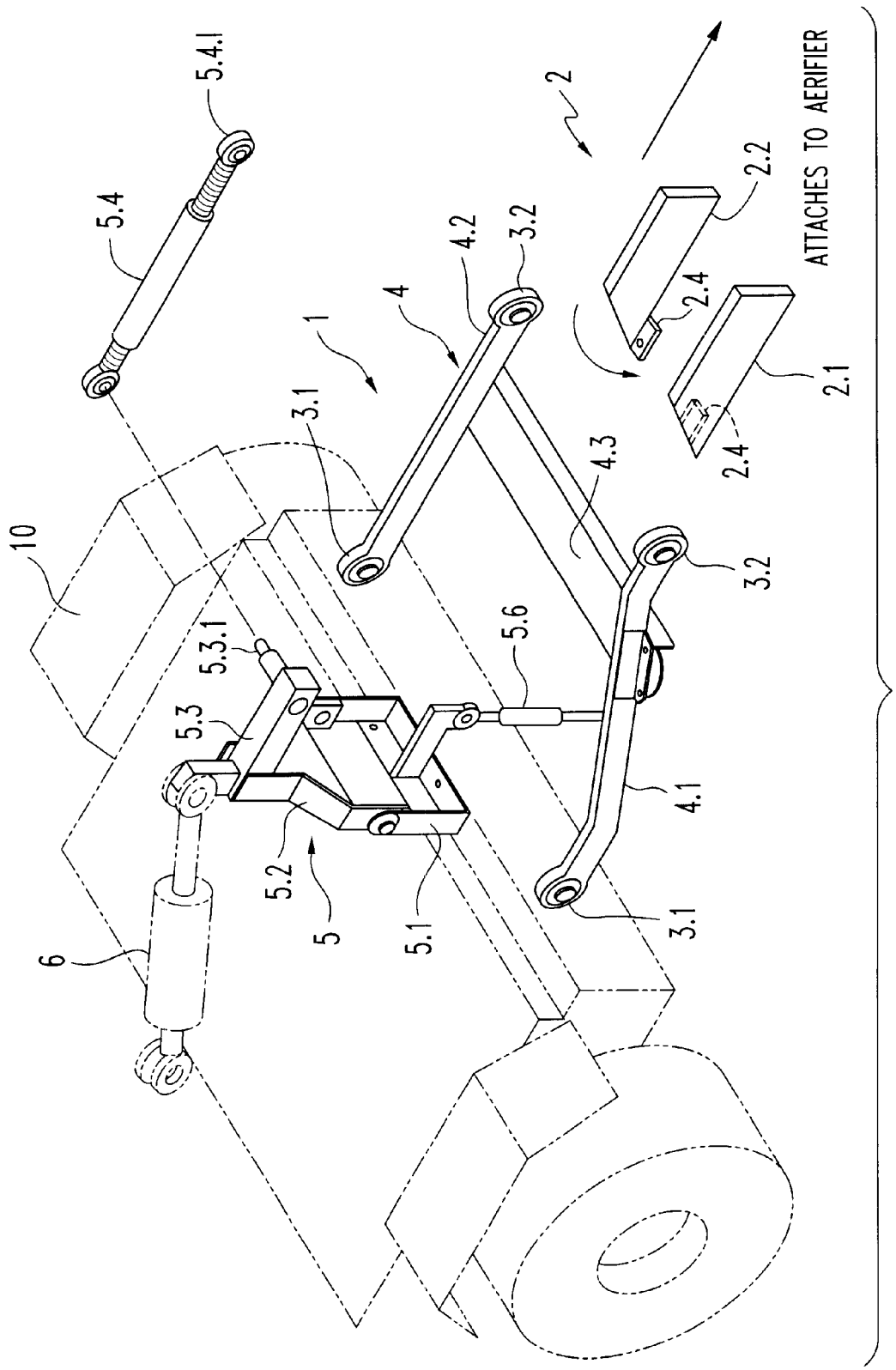
FIG. 1 is an isometric view of the hitch system.

Shown in FIG. 1 is the hitch system for a utility vehicle. The hitch is used in conjunction with equipment pulled behind the utility vehicle. The system will be described where the pulled vehicle is a soil aerifier, such as contained in U.S. Pat. No. 5,709,272. herein incorporated by reference. However, the system could be used with other towed devices. Additionally, the hitch system is described as being connected to a vehicle having a power take off (PTO) point, but the hitch system can be used with alternative power sources, such as hydraulic motors used to drive the lift system and to supply power to the towed equipment (if needed).

The hitch system has two basic components, a first component 1 (see FIG. 1), being attached to the towing vehicle, and a second component 2, being attached to the towed equipment (see FIG. 1), but being engagable to the first component 1 as later described. As shown, first component 1 consists of a first frame member 4, and a lift frame 5. Lift frame 5 can be coupled to a device for raising and lowering the towed equipment. Lift frame 5 consists of a first member 5.1 fixedly attached to utility vehicle 10, and a second member 5.2 which is pivotally attached to first member 5.1, at joints 5.2.1. Second member 5.2 is pivotally attached to lifting link 6. Lifting link 6 is a powered link, generally powered by the utility vehicle, such as a PTO, however, it could be powered by hydraulics, an external winch, or any other power means. As shown, lifting link 6 is a hydraulic piston link, which operates by changing its length and is connected to the utility vehicle's PTO.

Fixedly attached to second member 5.2 is third member 5.3. Third member 5.3 contains an offset attachment point 5.3.1, which provides a pivotal connection to top link 5.4. As shown, tow point 5.3.1 is a pin through which top link can be attached. Other configurations of the tow point are possible, such as yokes, (e.g. U shaped or otherwise through which a pin on the top link is clamped or pinned, not shown). Obviously, the end of the top link which attaches or links to the tow point would have to be structurally modified to adapt to the configuration of the tow point. Top link 5.4 (sometimes referred to as the upper link) is pivotally connected at its distal end 5.4.1 to the towed equipment. In certain types of utility vehicles, the lift frame 5 might be directly attached to top link 5.4. In the instant case, a primary purpose of first and second members 5.1 and 5.2 respectively, is to provide a movable "connection point" or tow point (5.3.1) between the towed equipment and the utility vehicle which is offset from the utility vehicle's centerline, the purpose of which will be described later. The vehicle's centerline is a plane cutting the vehicle into a right half and a left half (as opposed to a forward half and a rearward half). Similarly, a towed device will also have a centerline.

First frame 4 consists of two arms, 4.1 and 4.2 which are pivotally connected to utility vehicle through ball joints 3.1, and to the pulled equipment through ball joints 3.2. As shown, one of the arms (arm 4.1) contains a dogleg 4.1.5 or offset section. It is preferred to utilize two frame members, 4.1 and 4.2, but not required. The purpose of this offset is to position or align the towed equipment offset from the centerline of the towing utility vehicle. For certain towed equipment, it may be desirable to have both arms 4.1 and 4.2 offset. As shown, first frame 4 is the primary "towbar" connection between towed and the towing equipment, with lift frame 5 being the mechanism to raise and lower the towed equipment.

As shown, the tow point 5.3.1, is offset from the vehicle's centerline. The offset to the tow point is provided by placing the tow point 5.3.1 on one side of third member 5.3, when third member 5.3 is located on the vehicle's centerline. Alternatively, the tow point can be placed on the centerline of lift frame 5 and the lift frame 5 could then be mounted off the centerline of the pulling vehicle. Further, as previously indicated, an offset may not be required for some applications, or for some utility vehicles. On some utility vehicles, the PTO point is not on the vehicle's centerline. In locating the lift frame 5, it is preferred to minimize the need for the PTO attachment point to be connected to the towed vehicle at large angles. Offsets needed to properly position the towed device can be accomplished by the combination of the lift frame's 5 placement on the vehicle and the position (or length) of the tow point 5.3.1.

The frame 4, as shown, is effectively offset from the centerline (see FIG. 3) by having at least one frame member bent or doglegged 4.1.5. In this fashion, the center of the pulled vehicle is aligned with the offset tow point on the pulling vehicle, 5.3.1.

The frame 4 also has a cross bar 4.3 to provide rigidity to the frame 4. Providing further rigidity is adjustable stabilizing rod 5.6, which connects between frame 5 and frame 4.

Generally, the PTO can attach and operate a towed device if the angle between the PTO exit point and the PTO attachment point does not exceed 20 degrees. However, the closer the angle is to zero degrees, the less wear and tear on the PTO and associated equipment. Consequently, if the PTO is offset from the centerline, it is helpful to offset the towed vehicle comparably to the PTO offset. A second reason may present itself for offsetting the towed vehicle. For instance, if the towed vehicle is a soil aerator, the utility vehicle will have to make multiple passes or swaths through a field to aerate the entire field. It is desired that the wheels of the utility vehicle avoid passing over areas aerated in previous passes. If the towed aerator is wider than the utility vehicle, it is possible for the utility vehicle to perform multiple aeration passes without crossing over previously aerated areas (in this instance, and offset aerator would not be necessary). If the utility vehicle is wider than the aerator, multiple aeration passes would cause the utility vehicle's wheels to pass over previously aerated areas, thereby compacting these areas. If however, the towed aerator was towed offset from the utility vehicle so that one end of the aerator lined up with one of the wheels of the utility vehicle (say it lines up with the rear right wheel) then by consistently turning in the direction of the offset (right), multiple passes can be made without compacting previously aerated soil (the passes are made in a fashion depicted in FIG. 2 for an right offset aerator 100). Offset from the centerline means that the vehicle's centerline is offset from the towed device's centerline.

A novel feature of the hitch system is that the towed equipment is almost rigidly connected to the vehicle when raised, but flexibly coupled to the vehicle when lowered. This "decoupling" of the towed equipment from the utility vehicle is performed by the interaction of the first component 1 (the frame 4) and the second component 2.

As shown, second component 2 consists of two bars 2.1 and 2.2 (one bar is feasible but not preferred). Each bar operates as a stop link as will be described. The bars are fixedly attached to the towed vehicle. Protruding from the two bars are lip sections 2.4. Lip sections 2.4 are shown with threaded holes therethrough. Bolts may be positioned in these holes. Bars 2.1 and 2.2 are mounted to the towed vehicle so that bars are located above frame cross member 4.3. Bars 2.1 and 2.2 are mounted on the towed vehicle so that lip section of bars contacts or engages the top of frame cross member 4.3 when the aerator is in the raised position (off the ground). Bolts through lip sections may be used to fine-tune the point of coupling/decoupling of the bars (now the bolt would contact the frame cross member, instead of the lip sections) with frame cross member 4.2. Obviously, lip sections could contact another area or portion of frame to accomplish the desired coupling/decoupling. In this fashion bars and lip sections are engagable/disengagable with frame cross member 4.3, as now described (obviously, the lip sections could be mounted so that lip sections are located below the bar 4.3, in which case the lip sections or bolts would come in contact with the bottom of cross member 4.3).

Raising the Towed Aerator

For illustration purposes, the towed device will be an aerator. The aerator is deployed, resting on the ground. To raise the aerator, hydraulic piston link 6 is shortened, causing upper link 5.4 to move upwardly and in a direction toward the utility vehicle (forward movement). The aerator is pivotally attached to upper link 5.4 and consequently, the aerator's motion will follow that of upper link 5.4, but the aerator will tend to pivot about the point of attachment to upper link 5.4. Once the aerator is raised sufficiently to lose contact with the ground, further upward movement will bring bars 2.1 and 2.2 into proximity with frame cross member 4.3, and (depending on the configuration) either the lip sections or the bolts will contact frame member 4.3. The bars act as stop links to prevent further rotation of the raised aerator. The bars 2.1 and 2.2 could be without lip sections, and instead, the bars themselves could be the point of contact between bars and cross bar. What is required is a member attached to the towed vehicle contacting a portion of the frame 4, not necessarily the frame cross bar. Once contact is established, frame 4, aerator and upper link 5.4 are coupled and move substantially as a unit upon further upward movement. The coupling prevents the aerator from pivoting about the connection point 5.4.1 while the frame 4 resists side-to-side movement of the raised aerator, thus stabilizing the position of the aerator in the raised position for transportation.

Lowering the Towed Aerator

Lowering the aerator is the reverse process. In the raised position, aerator and frame are coupled through contact of bars 2.1 and 2.2 with frame 4 (through cross member 4.3). As the hydraulic piston link 6 is lengthened, upper link 5.4, though its coupling 5.3 to the hydraulic piston link 6, forces the aerator downward and slightly rearward. Frame 4 follows this motion, pivoting downward through connection points 3.1. Once the aerator engages ground, bars (fixed to aerator frame) can no longer move downward. Further lengthening of hydraulic piston link 6 will cause aerator to pivot rearwardly (that is, towards the towing vehicle) about attachment point 5.4.1, causing bars 2.1 and 2.2 to decouple from frame 4. This decoupling of the frame 4 from the aerator allows the aerator to more closely follow the contours of the earth as it is dragged behind the utility vehicle in the lowered position. Further, the coupling of the frame to the aerator when raised prevents the aerator from pivoting or swinging and allows the operator to move from location to location without the aerator being knocked about and damaged.

Figure 4A:
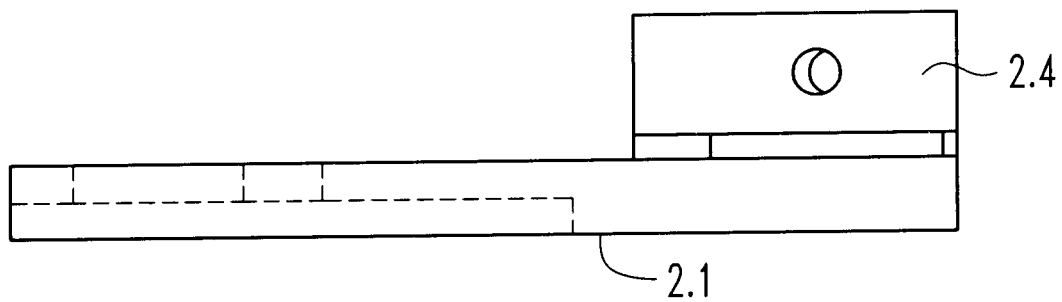
FIG. 4 is a side view of the third frame.
Figure 4B:
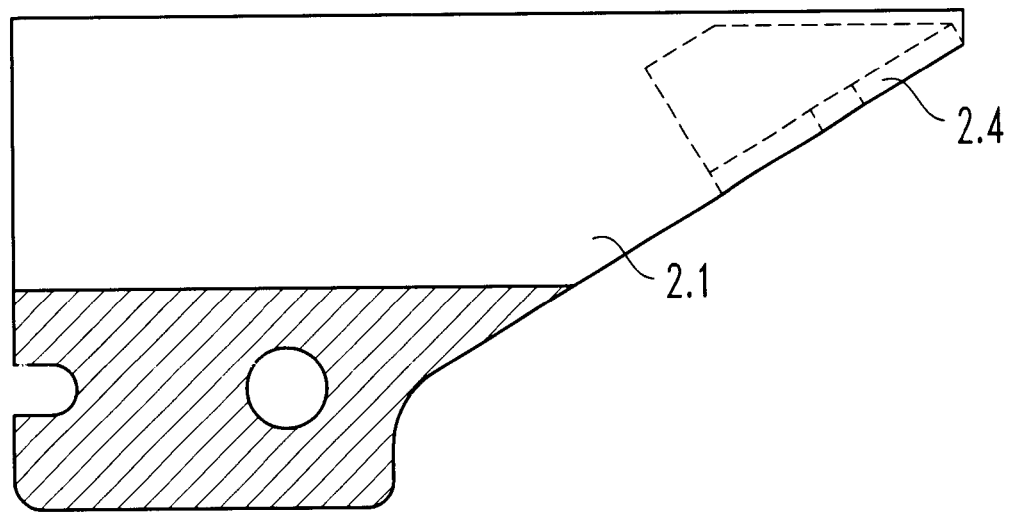
Figure 5:
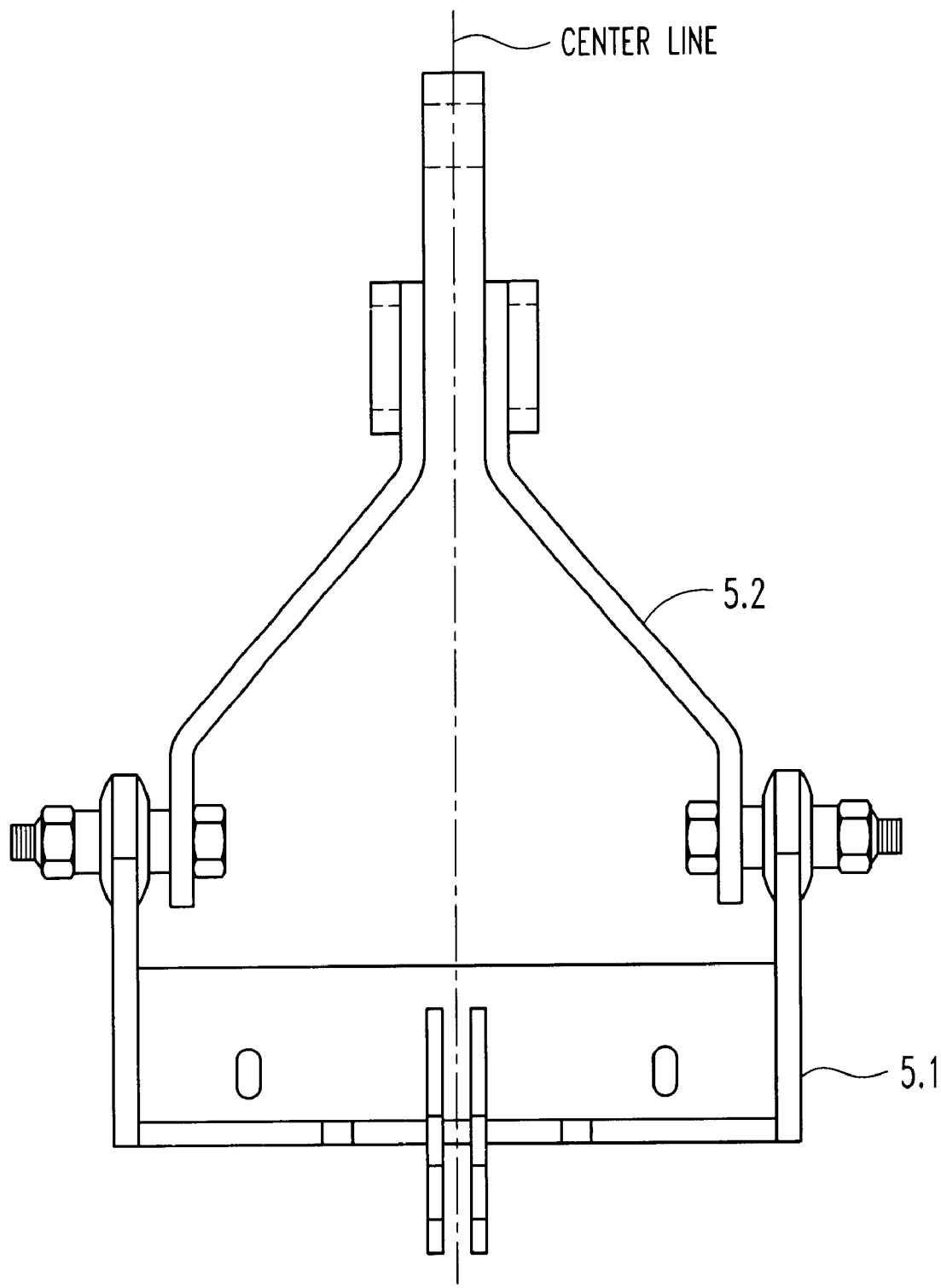
FIG. 5 is a front view of the lift frame showing the centerline.

FIG. 4 shows the details of the preferred embodiment of the bars 2.1, and FIG. 3 shows the details of one embodiment of the frame 4, where the frame 4 has an offset or dogleg section.

We claim:

1. A hitch system attachable between a towing utility vehicle and a towed device, said utility vehicle having a power source, said hitch system comprising a first frame adapted to pivotably couple said towing vehicle and said towed device, a lift frame attachable to said utility vehicle, said lift frame having a first member and a second member, said second member pivotably connected to said first member, said second member being operationably connectable to said power source to pivot said second member in relation to said first member, and a single top link pivotably connectable to said second member and said towed device, wherein said second member has a centerline and a tow point, said tow point being positioned off said centerline, said single top link being connected to said second member at said tow point.

2. A hitch system according to claim 1 further having a coupling means mountable to said towed device to couple and decouple said towed device from said lift frame.

3. A hitch system according to claim 2 where said coupling means comprises at least one bar mountable on the towed device, said bar, when mounted, positioned to couple and decouple by engaging and disengaging a portion of said first frame.

4. A hitch system attachable between a towing utility vehicle and a towed device, said utility vehicle having a power source, said hitch system comprising a first frame adapted to pivotably couple said towing vehicle and said towed device, a lift frame attachable to said utility vehicle, said lift frame having a first member and a second member, said second member pivotably connected to said first member, said second member being operationably connectable to said power source to pivot said second member in relation to said first member, and a top link pivotably connectable to said second member and said utility vehicle wherein said utility vehicle has a centerline and said first frame has at least one frame member having a first and second end, said first end adapted to pivotably couple to said utility vehicle, said second end adapted to pivotably couple to said towed device, so that when so coupled, a line drawn between said first end and said second end would be non-parallel said centerline of said vehicle.

5. A hitch system according to claim 4 wherein one of said at least one frame member is doglegged.

6. In a system having a utility vehicle with a vehicle centerline, and a towed device with a device centerline, said utility vehicle having a power source, a hitch system attached between said towing utility vehicle and said towed device, said hitch system comprising a first frame pivotably coupled to said towing vehicle and said towed device, a lift frame attached to said utility vehicle, said lift frame having a first member and a second member, said second member pivotably connected to said first member, said second member being operationably connected to said power source to pivot said second member in relation to said first member, a top link pivotably connected to said second member and said towed device, said second frame adapted so that said device centerline is offset from said vehicle centerline.

7. A hitch system according to claim 6 further having a coupling/decoupling means positioned on said towed device, to couple and decouple said towed device to said second frame.

8. A hitch system according to claim 7 where said coupling means comprises at least one bar mountable on the towed device, said bar, when mounted, positioned to couple and decouple by engaging and disengaging a portion of said first frame.

9. A hitch system according to claim 6 further having a hydraulic piston link operationally connecting said second member to said power source.

10. In a system having a utility vehicle with a vehicle centerline, and a towed device with a towed device centerline, said utility vehicle having a power source, a hitch system attached between said towing utility vehicle and said towed device, said hitch system comprising a first frame pivotably coupled to said towing vehicle and said towed device, a lift frame attached to said utility vehicle, said lift frame having a first member and a second member, said second member pivotably connected to said first member, said second member being operationably connected to said power source to pivot said second member in relation to said first member, a top link pivotably connected to said second member and said towed device, said second frame adapted so that said towed device centerline is offset from said vehicle centerline.

11. A hitch system according to claim 10 further having a coupling/decoupling means positioned on said towed device, to couple and decouple said towed device to said second frame.

12. A hitch system according to claim 11 where said coupling means comprises at least one bar mountable on the towed device, said bar, when mounted, positioned to couple and decouple by engaging and disengaging a portion of said first frame.

13. A hitch system according to claim 10 further having a hydraulic piston link operationally connecting said second member to said power source.

\* \* \* \* \*